April 29, 1930.  H. V. RAU  1,756,385
PRONGED FASTENER
Filed Sept. 24, 1927  2 Sheets-Sheet 1

Inventor:
Henry V. Rau,
By his Attorney
Frank J. Kent

April 29, 1930. H. V. RAU 1,756,385
PRONGED FASTENER
Filed Sept. 24, 1927 2 Sheets-Sheet 2

Inventor:
Henry V. Rau,
By his Attorney
Frank Albert

Patented Apr. 29, 1930

1,756,385

UNITED STATES PATENT OFFICE

HENRY V. RAU, OF BROOKLYN, NEW YORK, ASSIGNOR TO EDWIN B. STIMPSON COMPANY, OF BROOKLYN, NEW YORK

PRONGED FASTENER

Application filed September 24, 1927. Serial No. 221,712.

This invention relates to a pronged fastener adapted to a wide variety of uses, and to a machine for setting the fasteners.

The invention aims to provide a simple two-prong fastener in which one of the prongs is bent into a hook extending away from the body of the fastener. The fastener can be set into any flat member of relatively thin and penetrable material, and can be used in a number of ways to secure articles to the flat member.

The invention also provides special machinery for setting the new pronged fastener.

While preferred embodiments have been disclosed herein for purposes of illustration, it should be understood that various changes and modifications may be made in the structure without departing from the spirit and scope of the invention as hereinafter set forth and claimed.

Figure 1:
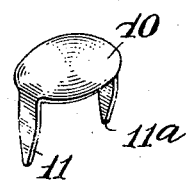
Fig. 1 is a perspective view of one of the fasteners prior to the setting operation.

Referring to the drawings more particularly, it will be seen that the fastener comprises a curved body 10 having prongs 11 and 11ª extending downwardly from its opposite sides. The ends of the prongs are formed to permit them to readily pierce the flat member into which the fastener is to be set, the fastener being made of a relatively stiff yet bendable metal so that the prongs can be bent to the desired position in the setting operation, and will retain the set thus acquired.

The machine for setting the rivets includes the anvil 12, which has its upper face formed with a semi-circular indent 13 and with a semi-elliptical indent 14. The feed mechanism is so arranged that the fasteners are moved into position above the anvil with the prong 11ª at the right hand end of indent 14 (Fig. 5) and with the prong 11 at the right hand end of indent 13. The driving plunger 15, which is reciprocated by mechanism of a well-known type, is positioned to contact with the fastener and has on its lower end a concavity 16 fitting over the top of the fastener, one of its sides being formed with a notch 17.

Figure 4:
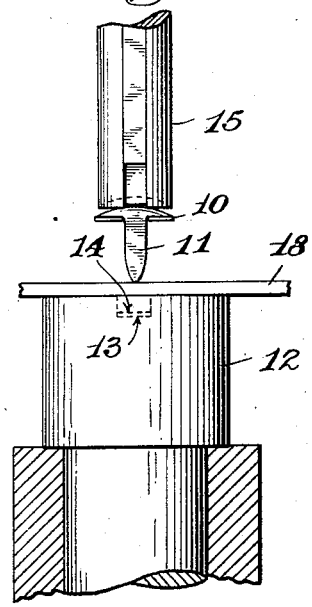
Fig. 4 is an elevation of certain operating parts of the setting machine in a position ready to operate on the fastener.
Figure 5:
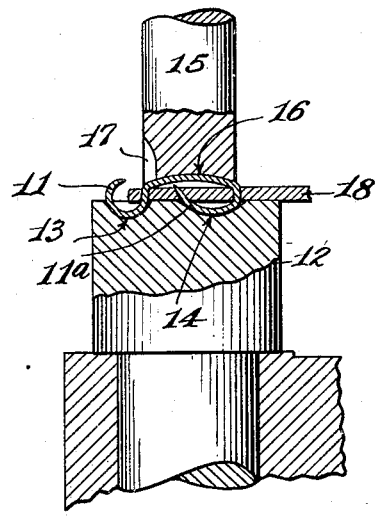
Fig. 5 is a view similar to Fig. 4 but showing the parts in section after operating on the fastener.

In setting the fastener the flat member 18 to which the fastener is to be secured, is placed over the anvil to the position of Figs. 4 and 5, and the fastener is fed to preliminary position of Fig. 4 by suitable feed mechanism not shown. The plunger 15 now descends, pushing both prongs of the fastener through the flat member 18 and causing both of them to curl to the left as shown in Fig. 5. The engagement of the prong 11 with the semi-circular indent 13 causes it to curl around sharply to form a circular hook, while the prong 11ª is bent on a flatter curve by the indent 14.

Figure 2:
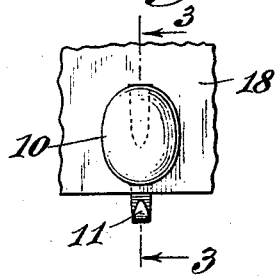
Fig. 2 is a plan view of one of the fasteners after being set.
Figure 3:
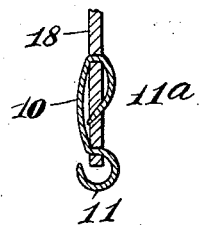
Fig. 3 is a section on line 3—3 of Fig. 2.
Figure 6:
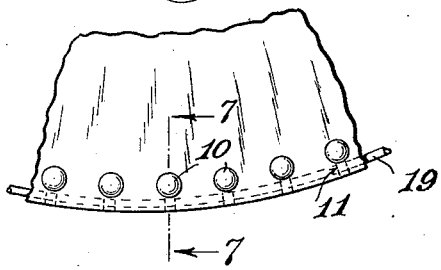
Fig. 6 is a fragmentary view of a lamp shade embodying the fasteners of this invention.
Figure 7:
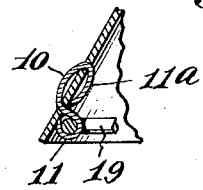
Fig. 7 is a section on line 7—7 of Fig. 6.

When the flat member 18 has been fed as far as the position of Fig. 5 prior to the setting operation, the hook formed by the prong 11 will extend beyond the end of the member 18, and will be available for suspending articles for display purposes, as will be clear from Figs. 2 and 3. The fastener may also be set in such a position that the hook formed by prong 11 is entirely concealed behind the member 18, as shown in Figs. 6 and 7. In this case the fasteners are shown as used for securing a frame member 19 to a lamp shade. The prong 11ª may be bent so that its end rests against the back side of the member 18, as shown in Fig. 7, or it may be caused to again penetrate the member 18 as shown in Fig. 5.

Figure 9:
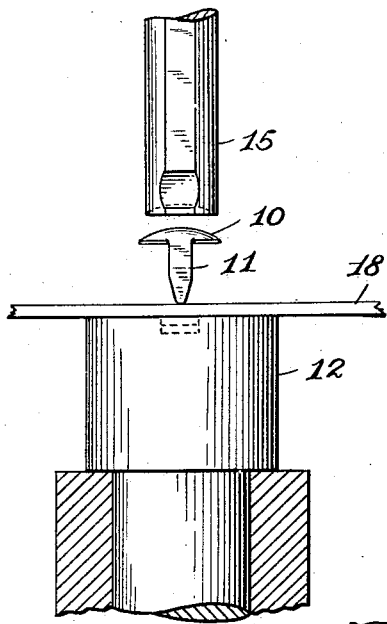
Fig. 9 is a view similar to Fig. 4 showing parts of a machine for setting the fastener of Fig. 8.
Figure 10:
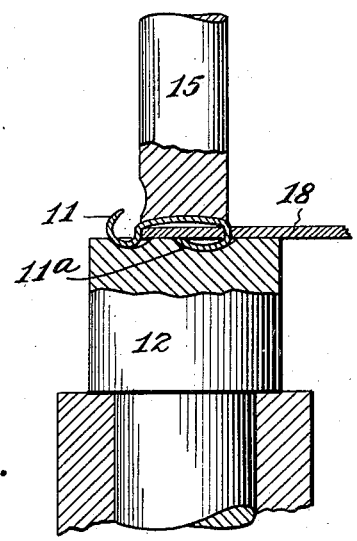
Fig. 10 is a view similar to Fig. 9 but showing the parts in section after operating on the fastener.
Figure 8:
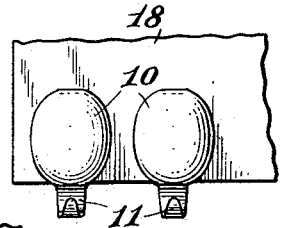
Fig. 8 is an elevation of a modified form of fastener.

Fig. 8 illustrates how the fasteners may be set with the prong 11 projecting below, instead of through, the member 18. In this case the flat member 18 is not fed as far to the left as it was in Fig. 5. (See Figs. 9 and 10.)

Figure 11:
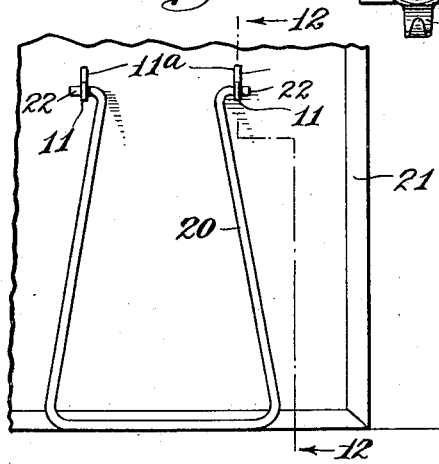
Fig. 11 is a view showing the use of the fasteners to secure a hinged stand to an easel.
Figure 12:
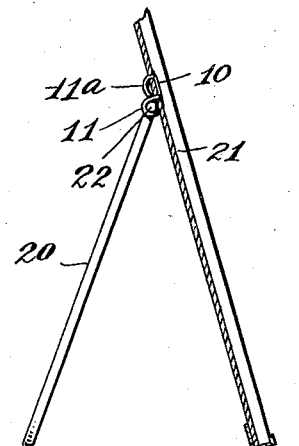
Fig. 12 is a section on line 12—12 of Fig. 11.

The fastener may be used in a large number of situations where a hooked or hinged fastener is needed as will be clear to those versed in the arts concerned. Figs. 11 and 12 show its use in securing a hinged wire stand 20 to a picture or mirror 21, the curved prongs 11 being caused to engage the stand 20.

I claim:

1. In combination, a flat member, a pronged fastener secured to the member, the fastener comprising a body, prongs extending in the same direction from the body on its opposite sides, one of the prongs extending through the flat member and being curved into a hook extending beyond the body of the fastener, the second prong passing through the flat member and being bent in the same direction as the first prong and engaging the flat member to hold the fastener in place on the member.

2. In combination with a substantially flat piece of sheet material of moderate thickness, a sheet metal fastener having a rounded, substantially flat head and integral prongs extending in the same direction from opposite edges of the head, at least one of the prongs passing through the sheet material and being clenched down thereon and alongside the head to retain the latter in flat engagement with the surface of the sheet material; and the other prong being bent substantially into hook form extending generally outward from the head.

In testimony whereof I affix my signature.

HENRY V. RAU.